(12) United States Patent
Sakairi et al.

(10) Patent No.: US 9,707,816 B2
(45) Date of Patent: Jul. 18, 2017

(54) SYNTHETIC RESIN-MADE SLIDING BEARING

(71) Applicants: OILES CORPORATION, Tokyo (JP); OILES DEUTSCHLAND GMBH, Ober-Moerlen (DE)

(72) Inventors: Yoshikazu Sakairi, Fujisawa (JP); Katsunori Saito, Fujisawa (JP); Robert Hamrodi, Ober-Moerlen (DE); Kai Metzler, Ober-Moerlen (DE); Yoshiteru Igarashi, Ober-Moerlen (DE)

(73) Assignees: OILES CORPORATION, Tokyo (JP); OILES DEUTSCHLAND GMBH, Ober-Moerlen (DE)

( * ) Notice: Subject to any disclaimer, the term of this patent is extended or adjusted under 35 U.S.C. 154(b) by 0 days.

(21) Appl. No.: 15/363,057

(22) Filed: Nov. 29, 2016

(65) Prior Publication Data

US 2017/0072759 A1    Mar. 16, 2017

Related U.S. Application Data

(63) Continuation of application No. 14/767,700, filed as application No. PCT/JP2014/000592 on Feb. 4, 2014, now Pat. No. 9,539,874.

(30) Foreign Application Priority Data

Feb. 15, 2013  (JP) .................................. 2013-028455

(51) Int. Cl.
*F16C 17/04*    (2006.01)
*B60G 15/06*    (2006.01)
(Continued)

(52) U.S. Cl.
CPC ......... *B60G 15/068* (2013.01); *B60G 15/067* (2013.01); *F16C 17/10* (2013.01);
(Continued)

(58) Field of Classification Search
CPC ........... F16C 17/04; F16C 17/10; F16C 33/20
(Continued)

(56) References Cited

U.S. PATENT DOCUMENTS 6,918,701 B2    7/2005    Ueno et al.
8,740,233 B2    6/2014    Morishige et al.
(Continued)

FOREIGN PATENT DOCUMENTS

JP    1-100922    7/1989
JP    2001-27229    1/2001
(Continued)

OTHER PUBLICATIONS

Extended European Search Report issued in App. No. 14751056.4 dated Sep. 20, 2016.
(Continued)

*Primary Examiner* — Phillip A Johnson
(74) *Attorney, Agent, or Firm* — Nixon & Vanderhye P.C.

(57) ABSTRACT

A synthetic resin-made sliding bearing includes a synthetic resin-made upper casing which is fixed to a vehicle body side through a mounting member; a synthetic resin-made lower casing which is superposed on the upper casing so as to be rotatable about an axis in a circumferential direction relative to the upper casing; and a synthetic resin-made sliding bearing piece disposed in a space between the upper casing and the lower casing.

11 Claims, 12 Drawing Sheets

(51) Int. Cl.
 *F16C 33/20* (2006.01)
 *F16C 17/10* (2006.01)
(52) U.S. Cl.
 CPC ........ *F16C 33/20* (2013.01); *B60G 2204/124* (2013.01); *B60G 2204/128* (2013.01); *B60G 2204/418* (2013.01); *B60G 2206/71* (2013.01); *F16C 2326/05* (2013.01)
(58) Field of Classification Search
 USPC .................................................. 384/368, 420
 See application file for complete search history.

(56) References Cited

U.S. PATENT DOCUMENTS

| | | |
|---|---|---|
| 2006/0215945 A1 | 9/2006 | Miyata et al. |
| 2010/0040317 A1 | 2/2010 | Kellam |
| 2010/0104228 A1 | 4/2010 | Kaneko |
| 2011/0019951 A1 | 1/2011 | Kaneko |
| 2013/0142462 A1 | 6/2013 | Morishige et al. |
| 2013/0322798 A1 | 12/2013 | Morishige et al. |
| 2014/0112605 A1 | 4/2014 | Morishige et al. |
| 2014/0355916 A1 | 12/2014 | Morishige et al. |
| 2015/0316099 A1 | 11/2015 | Morishige et al. |

FOREIGN PATENT DOCUMENTS

| | | |
|---|---|---|
| JP | 2004-293589 | 10/2004 |
| JP | 2009-250278 | 10/2009 |
| JP | 2009-257516 | 11/2009 |
| JP | 2012-172814 | 9/2012 |
| JP | 2013-002603 | 1/2013 |
| WO | WO 02/068835 | 9/2002 |
| WO | WO 2009/122746 | 10/2009 |
| WO | WO 2012/017591 | 2/2012 |
| WO | WO 2012/114679 | 8/2012 |
| WO | WO 2012/169130 | 12/2012 |
| WO | WO 2012/176380 | 12/2012 |

OTHER PUBLICATIONS

Extended European Search Report issued in App. No. 14751917.7 dated Jun. 23, 2016.
International Search Report issued in PCT/JP2014/000592 dated Mar. 25, 2014.
International Search Report issued in PCT/JP2014/000603 dated Mar. 25, 2014.
U.S. Office Action issued in U.S. Appl. No. 14/767,397 dated Jun. 17, 2016.

SYNTHETIC RESIN-MADE SLIDING BEARING

This application is a continuation of U.S. application Ser. No. 14/767,700, filed Aug. 13, 2015, which is the U.S. national phase of International Application No. PCT/JP2014/000592 filed Feb. 4, 2014 which designated the U.S. and claims priority to JP Patent Application No. 2013-028455 filed Feb. 15, 2013, the entire contents of each of which are hereby incorporated by reference.

TECHNICAL FIELD

The present invention relates to a synthetic resin-made sliding bearing, and more particularly to a sliding bearing which is suitably incorporated as a sliding bearing of a strut-type suspension (Macpherson type) in a four-wheeled motor vehicle.

BACKGROUND ART

In general, a strut-type suspension is mainly used for a front wheel of a four-wheeled motor vehicle, and is so arranged that a strut assembly incorporating a hydraulic shock absorber in an outer cylinder integrated with a main shaft is combined with a suspension coil spring. Among such suspensions, there is a type of structure in which the axis of the suspension coil spring is actively offset with respect to the axis of the strut, so as to allow the sliding of a piston rod of the shock absorber incorporated in the strut to be effected smoothly, and there is another type of structure in which the axis of the suspension coil spring is arranged in alignment with the axis of the strut. In either structure, a rolling bearing using balls or needles or a synthetic resin-made sliding bearing is disposed between a mounting member for a motor vehicle body and an upper spring seat member of the suspension coil spring to allow the rotation to be effected smoothly when the strut assembly rotates together with the suspension coil spring by the steering operation.

PRIOR ART DOCUMENTS

Patent Documents

[Patent Document 1] JP-A-2004-293589
[Patent Document 2] JP-A-2009-250278

Incidentally, since the upper spring seat member, on which the aforementioned bearing is disposed, is generally made of sheet metal and is therefore relatively heavy, and since the upper spring seat member made of sheet metal needs to be provided with coating for rust prevention, even if the synthetic resin-made sliding bearing is used instead of the expensive rolling bearing to attain the light weight and a low price of the undercarriage of the motor vehicle, there are limits to such attempts for the light weight and the low price owing to the weight, manufacturing cost, assembly cost, and the like of the upper spring seat member.

In Patent Document 1, a sliding bearing is proposed which is comprised of a synthetic resin-made upper casing having a vehicle body-side bearing surface for a vehicle body side and an annular lower surface; a reinforced synthetic resin-made lower casing which contains reinforced fibers and is superposed on the upper casing so as to be rotatable about the axis of the upper casing, and which has an annular upper surface opposed to the annular lower surface of the upper casing; and a synthetic resin-made annular thrust sliding bearing piece and a tubular radial bearing piece which are interposed between the annular lower surface and the annular upper surface, wherein a spring bearing surface for a suspension coil spring is integrally formed on a portion of the lower casing on an outer peripheral side of the vehicle body-side bearing surface and the thrust sliding bearing piece.

In addition, in Patent Document 2, a thrust sliding bearing is proposed which is comprised of a synthetic resin-made upper casing which has a vehicle body-side bearing surface for a vehicle body side and an annular lower surface; a reinforced synthetic resin-made lower casing which contains reinforced fibers and is superposed on the upper casing so as to be rotatable about an axis of the upper casing, and on which an annular upper surface opposed to the annular lower surface and a spring bearing surface for a suspension coil spring are integrally formed; and a thrust sliding bearing piece which is disposed in an annular gap between the annular lower surface and the annular upper surface, and has an annular thrust sliding bearing surface which is slidably brought into contact with at least one of the annular lower surface and the annular upper surface, wherein the vehicle body-side bearing surface, the thrust sliding bearing surface, and the spring bearing surface are arranged by being juxtaposed to each other in an axial direction.

According to these sliding bearings, since the reinforced synthetic resin-made lower casing containing reinforced fibers has the spring bearing surface for the suspension coil spring, it is possible to omit the upper spring seat member made of sheet metal, so that it is possible to eliminate a weight increase ascribable to the upper spring seat member made of sheet metal and a price increase ascribable to such as the fabrication, coating, and assembly of the upper spring seat member made of sheet metal, thereby making it possible to attain the light weight and a low price of the undercarriage of the motor vehicle.

SUMMARY OF THE INVENTION

Problems that the Invention is to Solve

However, since the lower casing, which is one of the sliding mating surfaces of the above-described sliding bearing, is formed of a reinforced synthetic resin containing a reinforcing filler such as glass fibers, if sliding occurs between the synthetic resin-made sliding bearing and that lower casing, a problem can possibly occur in that slidability declines, thereby causing the smoothness of the steering operation to decline.

The present invention has been devised in view of the above-described aspects, and its object is to provide a synthetic resin-made sliding bearing which is capable of preventing the sliding between the synthetic resin-made sliding bearing and the reinforced synthetic resin-made lower casing containing a reinforcing filler such as glass fibers to avoid the decline of the slidability, thereby making it possible to maintain smooth steering operation.

Means for Solving the Problems

A synthetic resin-made sliding bearing in accordance with the present invention comprises: a synthetic resin-made upper casing, a reinforced synthetic resin-made lower casing superposed on the upper casing so as to be rotatable about an axis in a circumferential direction relative to the upper casing, and a synthetic resin-made sliding bearing piece disposed between the upper casing and the lower casing, wherein the upper casing includes: an upper casing base portion having an annular lower surface in a vertical direction; an inner peripheral-side cylindrical suspended portion suspended from a radial inner peripheral end portion of the upper casing base portion; an outer peripheral-side cylindrical suspended portion suspended from a radial outer peripheral end portion of the upper casing base portion; an annular collar portion extending radially outwardly from a lower end portion of the outer peripheral-side cylindrical suspended portion; an inner annular protrusion which has a cylindrical inner peripheral surface continuously connected to a cylindrical inner peripheral surface of the outer peripheral-side cylindrical suspended portion and is suspended downwardly from an annular lower surface of the annular collar portion; an outer annular protrusion which is suspended downwardly from the annular lower surface of the annular collar portion to form an inner peripheral upper annular recessed portion radially outwardly in cooperation with the inner annular protrusion; and an engaging suspended portion which is suspended from an outer peripheral edge portion of the annular collar portion to form an outer peripheral upper annular recessed portion radially inwardly in cooperation with the outer annular protrusion, and which has on its inner peripheral surface an engaging bulged portion which bulges radially inwardly, wherein the lower casing includes: an annular lower casing base portion having an annular upper surface and an annular lower surface in the vertical direction; a cylindrical protruding portion which protrudes downwardly from the annular lower surface of the lower casing base portion and has a cylindrical inner peripheral surface continuously connected to a cylindrical inner peripheral surface of the lower casing base portion; an annular protruding portion which protrudes upwardly from the annular upper surface of the lower casing base portion and has a cylindrical outer peripheral surface continuously connected to a cylindrical outer peripheral surface of the lower casing base portion; an annular collar portion which extends radially outwardly from a lower end portion of the cylindrical outer peripheral surface of the lower casing base portion; at least one projecting portion which projects radially outwardly from the cylindrical outer peripheral surface of the lower casing base portion and extends upwardly from an annular upper surface of the annular collar portion; an annular protrusion protruding upwardly from the annular upper surface of the annular collar portion to form an inner peripheral lower annular recessed portion in cooperation with cylindrical outer peripheral surface of the lower casing base portion; an engaging protruding portion which protrudes upwardly from the annular upper surface of the annular collar portion to form an outer peripheral lower annular recessed portion radially inwardly in cooperation with the annular protrusion, and which has an engaged bulged portion bulging radially outwardly from an outer peripheral surface thereof; and an annular plate-like portion extending radially outwardly from an outer peripheral-side lower end portion of the annular collar portion, and wherein the sliding bearing piece includes: an annular thrust sliding bearing piece portion having an annular upper surface and an annular lower surface in the vertical direction; a cylindrical radial sliding bearing piece portion which is suspended from an outer peripheral end portion of the thrust sliding bearing piece portion and has a cylindrical inner peripheral surface and a cylindrical outer peripheral surface; and a corrugated meshing portion having projecting portions and indented portions which are alternately formed along the circumferential direction on a lower portion of the cylindrical inner peripheral surface of the radial sliding bearing piece portion, the sliding bearing piece being disposed between the upper casing and the lower casing such that the annular lower surface of the thrust sliding bearing piece portion is brought into contact with the annular upper surface of the annular protruding portion of the lower casing, and the cylindrical inner peripheral surface of the radial sliding bearing piece portion is brought into contact with the cylindrical inner peripheral surface of the annular protruding portion of the lower casing, and such that the indented portion of the corrugated meshing portion is meshed with the projecting portion of the lower casing so that the sliding bearing piece is prevented from rotating about the axis with respect to the lower casing, the upper casing being combined with the lower casing such that the annular lower surface of the upper casing base portion is brought into slidable contact with the annular upper surface of the thrust sliding bearing piece portion, and the cylindrical inner peripheral surface of the outer peripheral-side cylindrical suspended portion is brought into slidable contact with the cylindrical outer peripheral surface of the radial sliding bearing piece portion, and such that the inner annular protrusion and the outer annular protrusion are respectively opposed to the inner peripheral lower annular recessed portion of the lower casing and the outer peripheral lower annular recessed portion of the lower casing, and the engaging bulged portion of the engaging suspended portion is resiliently fitted to the engaged bulged portion of the engaging protruding portion of the lower casing.

According to such a sliding bearing, since the indented portions of the corrugated meshing portion are meshed with the projecting portions, the sliding bearing piece is prevented from rotating about the axis with respect to the lower casing, with the result that the sliding between the sliding bearing piece, on the one hand, and the upper casing and the lower casing, on the other hand, is confined to the sliding between the synthetic resins excellent in the sliding characteristics between the annular upper surface of the thrust sliding bearing piece portion and the annular lower surface of the upper casing base portion and between the cylindrical outer peripheral surface of the radial sliding bearing piece portion and the cylindrical inner peripheral surface of the outer peripheral-side cylindrical suspended portion. Therefore, it is possible to avoid wear of the sliding bearing piece due to the lower casing and perform smooth steering operation over extended periods of time.

In addition, in the sliding bearing in accordance with the present invention, as for the respective sliding surfaces between the annular upper surface of the thrust sliding bearing piece portion and the annular lower surface of the upper casing base portion and between the cylindrical outer peripheral surface of the radial sliding bearing piece portion and the cylindrical inner peripheral surface of the outer peripheral-side cylindrical suspended portion, an annular gap which is formed in a resiliently fitted section between the engaging suspended portion of the upper casing and the engaging protruding portion of the lower casing is closed by the annular plate-like portion formed at the lower end portion of the engaging protruding portion, while the space between the upper casing and the lower casing is closed by sealing portions exhibiting labyrinth action and formed by causing the inner annular protrusion of the annular collar portion of the upper casing to face the inner peripheral lower annular recessed portion and the outer annular protrusion to face the outer peripheral lower annular recessed portion of the lower casing, thereby providing protection against the ingress of dust and the like. Therefore, it is possible to prevent as practically as possible a decline in the sliding characteristics ascribable to the ingress of dust and the like onto the sliding surfaces.

In the synthetic resin-made sliding bearing in accordance with the present invention, the lower casing base portion and the cylindrical protruding portion protruding downwardly from the annular lower surface of the lower casing base portion may be reinforced by a metallic reinforcing member having a cylindrical portion which is fitted over a cylindrical outer peripheral surface of the cylindrical protruding portion and an annular collar portion which is formed integrally with one end portion of the cylindrical portion and is in contact with the annular lower surface of the lower casing base portion.

According to such a sliding bearing, as the annular lower surface of the lower casing base portion serving as an abutment surface of the suspension coil spring is reinforced by the metallic reinforcing member, it is possible to attain further improvement of the strength of the annular lower surface, so that it is possible to avoid causing damage and the like to the annular lower surface and, hence, the lower casing.

In the synthetic resin-made sliding bearing in accordance with the present invention, an annular recessed groove may be formed in an annular end face of the cylindrical protruding portion of the lower casing, and an outer peripheral surface of an end portion of the cylindrical outer peripheral surface of the cylindrical protruding portion with the annular recessed groove formed therein may be formed as an annular tapered surface which gradually expands radially outwardly of the cylindrical outer peripheral surface of the cylindrical protruding portion, excluding the cylindrical outer peripheral surface, toward the annular end face of the cylindrical protruding portion, in which case the reinforcing member fitted over the cylindrical outer peripheral surface of the cylindrical protruding portion may be prevented from coming off downwardly as the outer peripheral surface of the end portion formed as the annular tapered surface of the cylindrical protruding portion in the cylindrical portion projects radially outwardly on a lower end surface side of the cylindrical portion.

According to such a sliding bearing, since the annular recessed groove is formed in the annular lower surface of the cylindrical protruding portion, the fitting of the cylindrical portion of the reinforcing member over the cylindrical protruding portion can be effected easily by virtue of the easy diameter reducibility and flexibility of the cylindrical outer peripheral surface at the lower end portion of the cylindrical protruding portion and by virtue of the radially inwardly elastic deformation of the lower end portion of the cylindrical protruding portion. After the fitting, since the reinforcing member is prevented from coming off downwardly by the end portion of the cylindrical outer peripheral surface of the cylindrical protruding portion whose diameter is enlarged outwardly in the radial direction of the lower casing, the reinforcing member and the sliding bearing can be handled as an integral unit during the period until the sliding bearing is mounted to the mounting member of the strut-type suspension, so that their handling is facilitated.

The thrust sliding bearing piece portion of the sliding bearing piece may have pluralities of inner recessed portions and outer recessed portions which are formed in its annular upper surface along the circumferential direction and in at least two rows including an inner row and an outer row in the radial direction, and such inner recessed portions and outer recessed portions may be arranged with phase differences with respect to each other in the circumferential direction.

Each of the plurality of inner recessed portions may be defined by an inner circular arc-shaped wall surface extending in a circular arc shape about the axis as a center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces. Further, each of the plurality of outer recessed portions may be defined by an inner circular arc-shaped wall surface extending in a circular arc shape about the axis as the center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

In addition, the thrust sliding bearing piece may have at least two annular recessed grooves which are formed in its circular arc-shaped upper surface along the circumferential direction and concentrically with each other.

A ratio of a total area of opening surfaces of the pluralities of inner recessed portions and outer recessed portions in surfaces which combine the opening surfaces of the pluralities of inner recessed portions and outer recessed portions and the annular upper surface of the thrust sliding bearing piece portion, a ratio of a total area of opening surfaces of the plurality of annular recessed grooves in total surfaces which combine the opening surfaces of the plurality of annular recessed grooves and the annular upper surface of the thrust sliding bearing piece portion, or a ratio of a total area of opening surfaces of the pluralities of inner recessed portions and outer recessed portions and opening surfaces of the plurality of annular recessed grooves in surfaces which combine the opening surfaces of the pluralities of inner recessed portions and outer recessed portions, opening surfaces of the plurality of annular recessed grooves, and the annular upper surface of the thrust sliding bearing piece portion, is preferably 20 to 50%, more preferably 30 to 40%.

In these inner recessed portions and outer recessed portions as well as the annular recessed grooves for retaining lubricating oil such as grease, it suffices if the aforementioned ratio is at least 20%, and if this ratio exceeds 50%, the strength of the thrust sliding bearing piece portion is caused to decline, and plastic deformation such as creep is liable to occur.

The radial sliding bearing piece portion of the sliding bearing piece may have a plurality of axial grooves which are open in the vertical direction and are formed on its cylindrical outer peripheral surface by being spaced apart at equal intervals in the circumferential direction, and these axial grooves may also serve as a sump section for holding lubricating oil such as grease.

The synthetic resin-made sliding bearing in accordance with the present invention is preferably used as a sliding bearing for a strut-type suspension of a four-wheeled motor vehicle.

The synthetic resin for forming the upper casing may be a thermoplastic synthetic resin such as polyacetal resin, polyamide resin, or polybutylene terephthalate resin, and the synthetic resin for forming the lower casing may be a reinforced thermoplastic synthetic resin such as polyacetal resin, polyamide resin, or polybutylene terephthalate resin containing 30 to 50% by mass of a reinforcing filler including glass fibers, glass powder, carbon fibers, and the like. As the synthetic resin for forming the sliding bearing piece, it is possible to cite a thermoplastic synthetic resin such as polyolefin resin including polyacetal resin, polyamide resin, polybutylene terephthalate resin, and polyester resin as preferred examples.

Advantages of the Invention

According to the present invention, it is possible to provide a synthetic resin-made sliding bearing which is capable of preventing as practically as possible a decline in the sliding characteristics ascribable to the ingress of dust and the like onto the sliding surfaces because of the following: as for the respective sliding surfaces between the annular upper surface of the thrust sliding bearing piece portion and the annular lower surface of the upper casing base portion and between the cylindrical outer peripheral surface of the radial sliding bearing piece portion and the cylindrical inner peripheral surface of the outer peripheral-side cylindrical suspended portion of the upper casing, an annular gap which is formed in a resiliently fitted section between the engaging suspended portion of the upper casing and the engaging protruding portion of the lower casing is closed by the annular plate-like portion formed at the lower end portion of the engaging protruding portion, while the space between the upper casing and the lower casing is closed by sealing portions exhibiting labyrinth action and formed by causing the inner annular protrusion of the annular collar portion of the upper casing to face the inner peripheral lower annular recessed portion of the lower casing and the outer annular protrusion to face the outer peripheral lower annular recessed portion of the lower casing, thereby providing protection against the ingress of dust and the like, the synthetic resin-made sliding bearing being also capable of avoiding wear of the sliding bearing piece due to the lower casing and performing smooth steering operation over extended periods of time because of the following: since the indented portions of the corrugated meshing portion are meshed with the projecting portions, the sliding bearing piece is prevented from rotating about the axis with respect to the lower casing, with the result that the sliding between the sliding bearing piece, on the one hand, and the upper casing and the lower casing, on the other hand, is confined to the sliding between the synthetic resins excellent in the sliding characteristics between the annular upper surface of the thrust sliding bearing piece portion and the annular lower surface of the upper casing base portion and between the cylindrical outer peripheral surface of the radial sliding bearing piece portion and the cylindrical inner peripheral surface of the outer peripheral-side cylindrical suspended portion.

MODE FOR CARRYING OUT THE INVENTION

Figure 1:
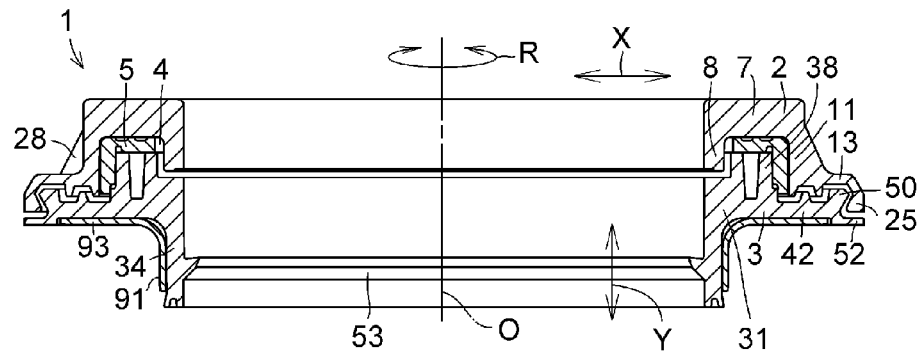
FIG. 1 is an explanatory cross-sectional view, taken in the direction of arrows along line I-I shown in FIG. 2, of a preferred embodiment of the present invention.
Figure 2:
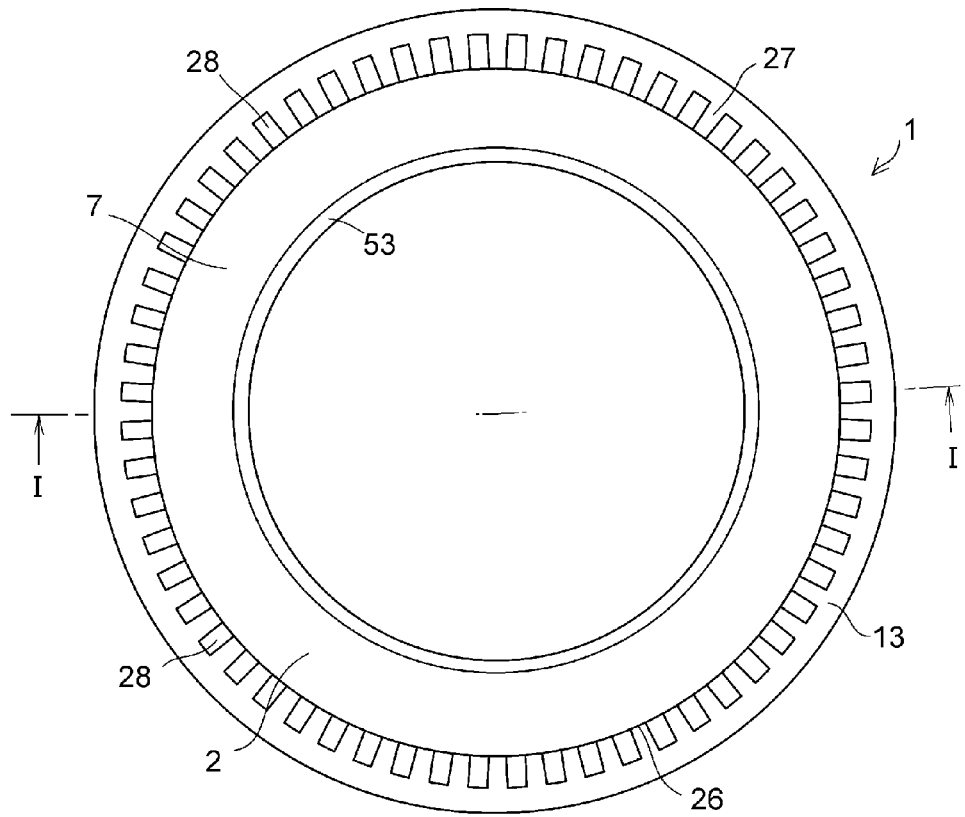
FIG. 2 is an explanatory plan view of the embodiment shown in FIG. 1
Figure 3:
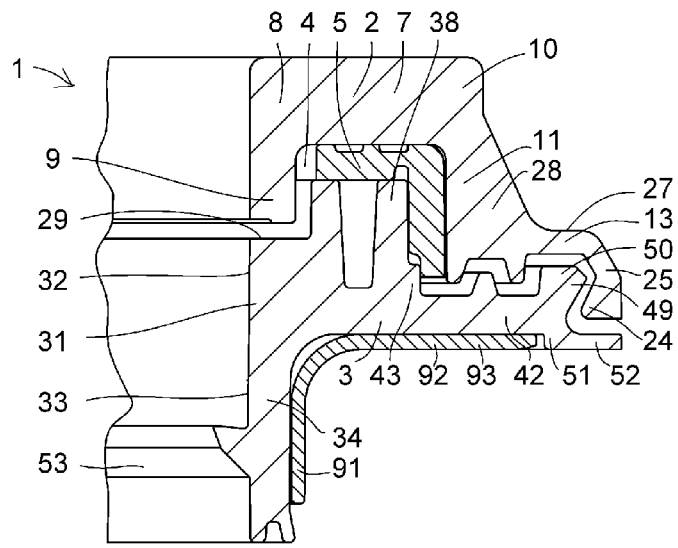
FIG. 3 is an explanatory partially enlarged cross-sectional view of the embodiment shown in FIG. 1.

In FIGS. 1 to 3, a synthetic resin-made sliding bearing 1 in accordance with this embodiment for use in a strut-type suspension of a four-wheeled motor vehicle is comprised of a synthetic resin-made upper casing 2 which is fixed to the vehicle body side through a mounting member; a synthetic resin-made lower casing 3 which is superposed on the upper casing 2 so as to be rotatable about an axis O in a circumferential direction R relative to the upper casing 2; and a synthetic resin-made sliding bearing piece 5 disposed in a space 4 between the upper casing 2 and the lower casing 3.

Figure 4:
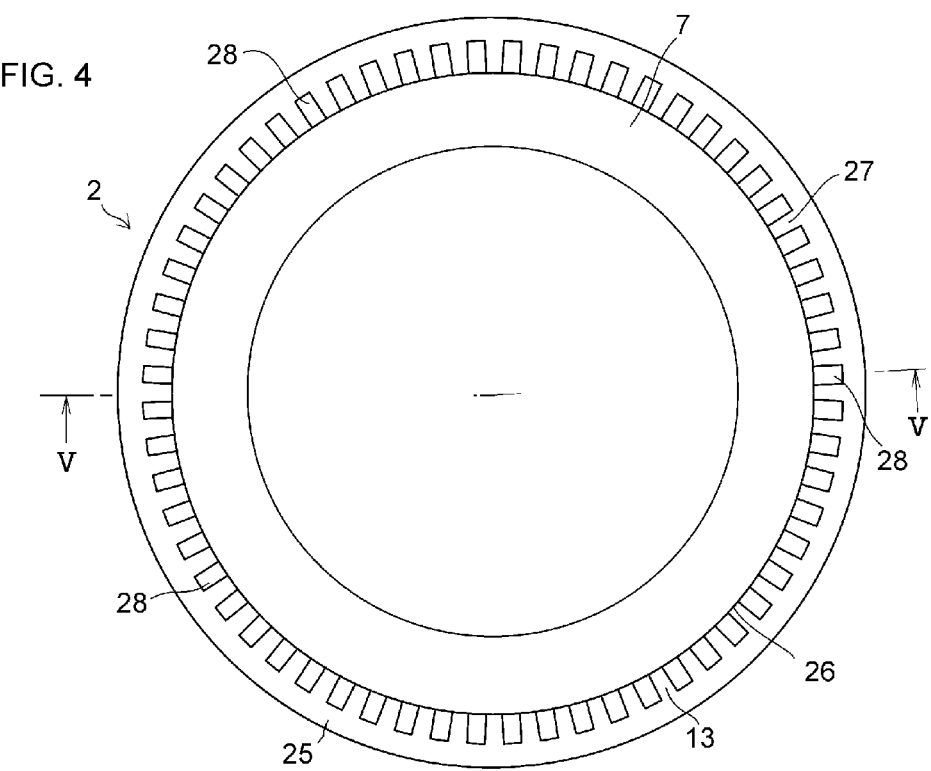
FIG. 4 is an explanatory plan view of an upper casing of the embodiment shown in FIG. 1.
Figure 5:
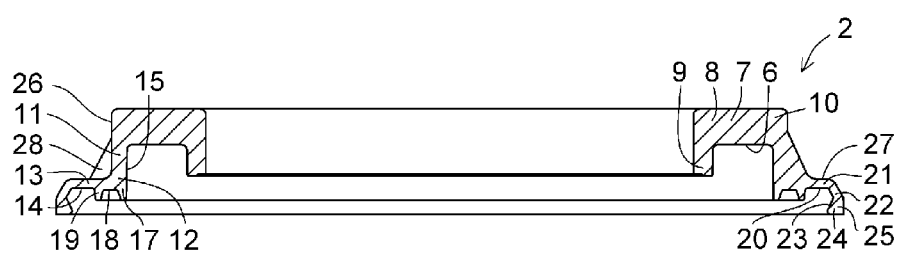
FIG. 5 is an explanatory cross-sectional view, taken in the direction of arrows along line V-V, of the upper casing of the embodiment shown in FIG. 4.
Figure 6:
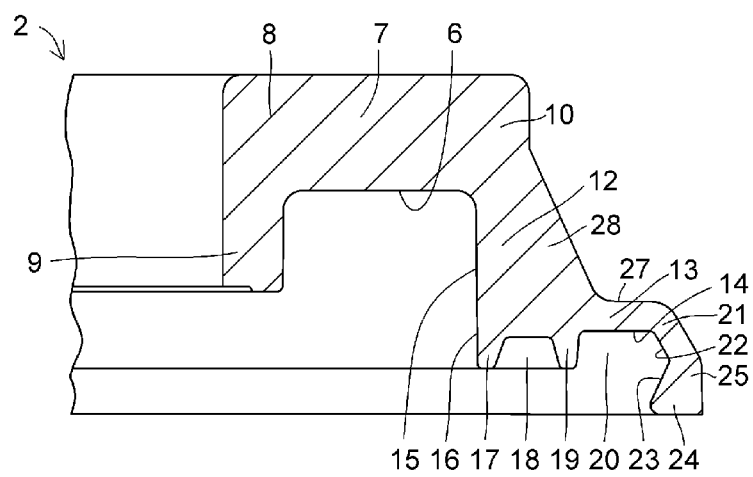
FIG. 6 is an explanatory partially enlarged cross-sectional view of the upper casing shown in FIG. 5.

As particularly shown in FIGS. 4 and 6, the upper casing 2 includes: an annular upper casing base portion 7 having an annular lower surface 6 in an axial direction, i.e., in a vertical direction Y; an inner peripheral-side cylindrical suspended portion 9 suspended from an inner peripheral end portion 8 in a radial direction X of the upper casing base portion 7; an outer peripheral-side cylindrical suspended portion 11 suspended from an outer peripheral end portion 10 in the radial direction X of the upper casing base portion 7; an annular collar portion 13 extending outwardly in the radial direction X from a lower end portion 12 of the outer peripheral-side cylindrical suspended portion 11; an inner annular protrusion 17 which has a cylindrical inner peripheral surface 16 continuously connected to a cylindrical inner peripheral surface 15 of the outer peripheral-side cylindrical suspended portion 11 and is suspended downwardly in the vertical direction Y from an annular lower surface 14 of the annular collar portion 13; an outer annular protrusion 19 which is suspended downwardly in the vertical direction Y from the annular lower surface 14 of the annular collar portion 13 to form an inner peripheral upper annular recessed portion 18 outwardly in the radial direction X in cooperation with the inner annular protrusion 17; and an engaging suspended portion 25 which is suspended downwardly from an outer peripheral edge portion 21 of the annular collar portion 13 to form an outer peripheral upper annular recessed portion 20 inwardly in the radial direction X in cooperation with the outer annular protrusion 19, and which has on an inner peripheral surface thereof an engaging bulged portion 24 bulging inwardly in the radial direction X and having an inclined surface portion 22 which is gradually enlarged in diameter outwardly in the radial direction X and an inclined surface portion 23 which is gradually reduced in diameter inwardly in the radial direction X and is continuously connected to the inclined surface portion 22.

The annular collar portion 13 is reinforced by a plurality of reinforcing ribs 28 each having a triangular cross section and continuously connected at one end portion thereof to a cylindrical outer peripheral surface 26 of the outer peripheral-side cylindrical suspended portion 11 and at another end portion thereof to an annular upper surface 27 of the annular collar portion 13 by being inclined outwardly in the radial direction X. The reinforcing ribs 28 are formed along the circumferential direction R of the annular collar portion 13.

Figure 7:
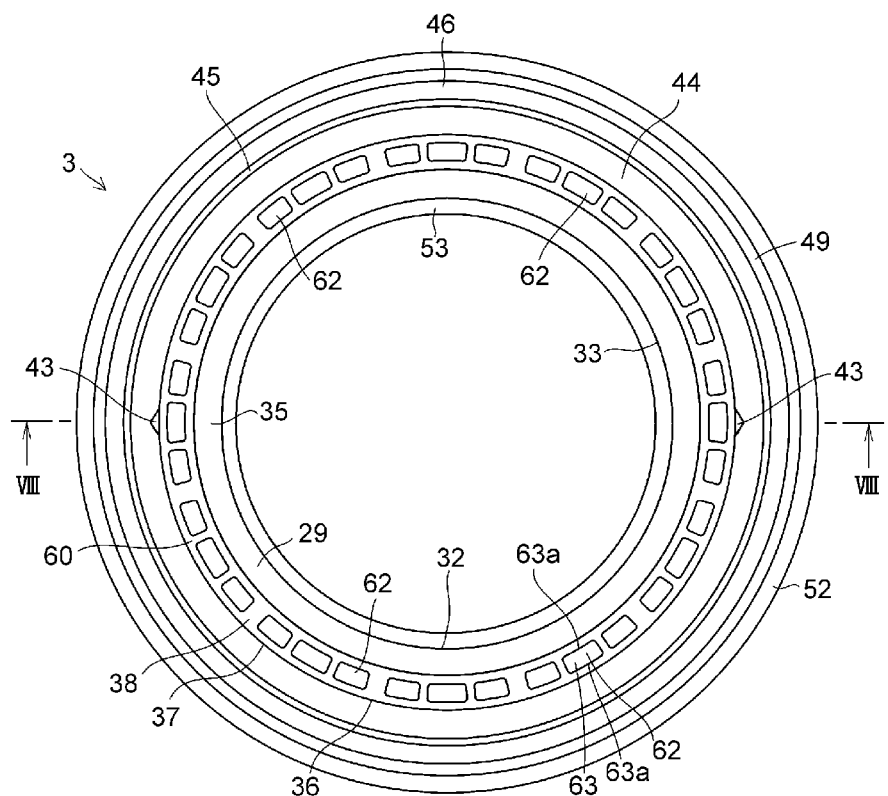
FIG. 7 an explanatory plan view of a lower casing of the embodiment shown in FIG. 1.

As particularly shown in FIGS. 7 to 10, the lower casing 3 includes: an annular lower casing base portion 31 which has an annular upper surface 29 and an annular lower surface 30 in the vertical direction Y; a cylindrical protruding portion 34 which protrudes downwardly in the vertical direction Y from the annular lower surface 30 of the lower casing base portion 31 and has a cylindrical inner peripheral surface 33 continuously connected to a cylindrical inner peripheral surface 32 of the lower casing base portion 31; an annular protruding portion 38 which protrudes upwardly in the vertical direction Y from the annular upper surface 29 of the lower casing base portion 31 by leaving an annular shoulder portion 35 outwardly in the radial direction X of the cylindrical inner peripheral surface 32 of the lower casing base portion 31, and which has a cylindrical outer peripheral surface 37 continuously connected to a cylindrical outer peripheral surface 36 of the lower casing base portion 31; an annular collar portion 42 which extends outwardly in the radial direction X from a lower end portion 39 of the cylindrical outer peripheral surface 36 of the lower casing base portion 31, and has an annular upper surface 40 and an annular lower surface 41 continuously connected to the annular lower surface 30 of the lower casing base portion 31; at least one, i.e., in this embodiment shown in FIG. 7, two projecting portions 43 with a triangular shape in a plan view, which project outwardly in the radial direction X from the cylindrical outer peripheral surface 36 of the lower casing base portion 31 and each has a lower surface continuously connected to the annular upper surface 40 of the annular collar portion 42, and which are formed in such a manner as to oppose each other in the radial direction X; an annular protrusion 45 protruding upwardly in the vertical direction Y from the annular upper surface 40 of the annular collar portion 42 to form an inner peripheral lower annular recessed portion 44 outwardly in the radial direction X of the cylindrical outer peripheral surface 36 of the lower casing base portion 31 in cooperation with cylindrical outer peripheral surface 36; an engaging protruding portion 50 having on an outer peripheral surface thereof an engaged bulged portion 49 which bulges and has an inclined surface portion 47 protruding upwardly in the vertical direction Y to form an outer peripheral lower annular recessed portion 46 outwardly in the radial direction X in cooperation with the annular protrusion 45 and being gradually enlarged in diameter outwardly in the radial direction X relative to the upper surface 40, and an inclined surface portion 48 which is gradually reduced in diameter inwardly in the radial direction X in such a manner as to be continuously connected to the inclined surface portion 47; and an annular plate-like portion 52 extending outwardly in the radial direction X from an outer peripheral-side lower end portion 51 of the annular collar portion 42 and continuously connected to the engaging protruding portion 50.

On the cylindrical protruding portion 34, an annular protrusion 53 is formed in such a manner as to extend inwardly in the radial direction X from its cylindrical inner peripheral surface 33. The annular protrusion 53 serves as a reinforcing rib for enhancing the radial crushing strength inwardly in the radial direction X of the cylindrical protruding portion 34.

An annular recessed groove 55 is formed in an annular end face 54 of the cylindrical protruding portion 34 in such a manner as to be open at the annular end face 54, and an outer peripheral surface of an end portion 56 of the cylindrical protruding portion 34 with the annular recessed groove 55 formed therein is formed as an annular tapered surface 58 which is gradually enlarged in diameter outwardly in the radial direction X of a cylindrical outer peripheral surface 57 of the cylindrical protruding portion 34 toward the lower side in the vertical direction Y. Thus, flexibility in the radial direction X is imparted to the end portion 56 of the cylindrical protruding portion 34 which is formed into the annular tapered surface 58.

A wide annular recessed portion 59 which is continuously connected to the cylindrical outer peripheral surface 57 of the cylindrical protruding portion 34 is formed in the annular lower surface 30 of the lower casing base portion 31 and in the annular lower surface 41 of the annular collar portion 42, and the annular recessed portion 59 forms a contacting portion for a metallic reinforcing member 93.

Figure 8:
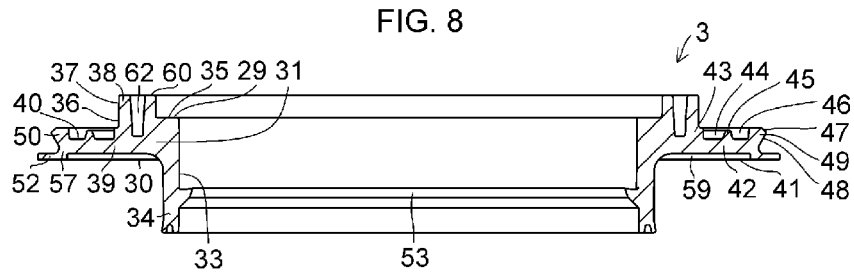
FIG. 8 is an explanatory cross-sectional view, taken in the direction of arrows along line VIII-VIII, of the lower casing of the embodiment shown in FIG. 7.
Figure 9:
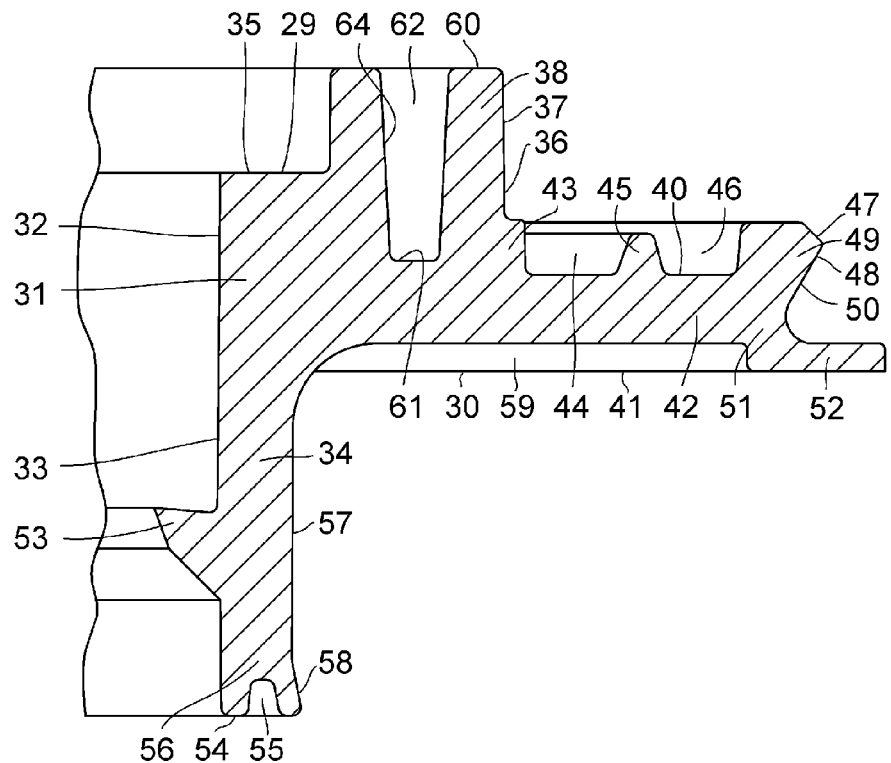
FIG. 9 is an explanatory partially enlarged cross-sectional view of the lower casing of the embodiment shown in FIG. 8.
Figure 10:
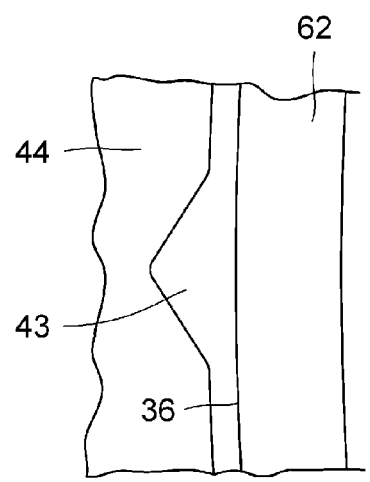
FIG. 10 is an explanatory enlarged plan view of a projecting portion of the lower casing of the embodiment shown in FIG. 7.

A plurality of hole portions 62 are formed in an annular upper surface 60 of the annular protruding portion 38 along the circumferential direction R in such a manner as to be open at the annular upper surface 60 and to extend from the annular upper surface 60 to the lower casing base portion 31 downwardly in the vertical direction Y, and are each provided with a bottom portion 61. As shown in FIGS. 7, 8, and 9, each of the hole portions 62 has an opening portion 63 which is rectangular in a plan view, and the hole portion 62 on a long side 63a side of the opening portion 63 has a pair of inclined surfaces 64 which are opposed to each other and the interval between which is gradually reduced as they extend downwardly in the vertical direction Y. These hole portions 62 play the role of making uniform the thickness of the lower casing base portion 31 and the annular protruding portion 38 by preventing as practically as possible the occurrence of sink marks and the like during molding.

Figure 11:
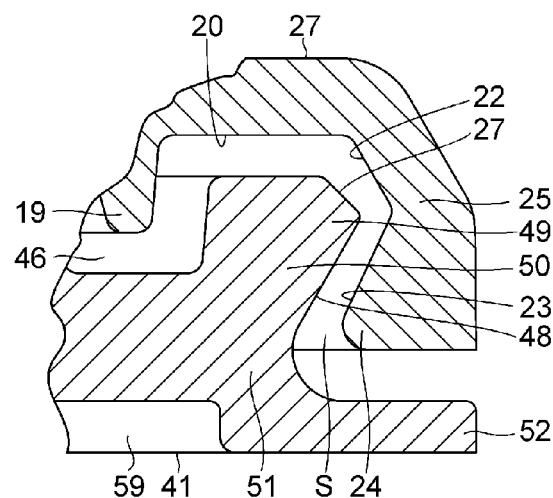
FIG. 11 is an explanatory enlarged cross-sectional view of a resiliently fitted section of the upper casing and the lower casing of the embodiment shown in FIG. 1.
Figure 12:
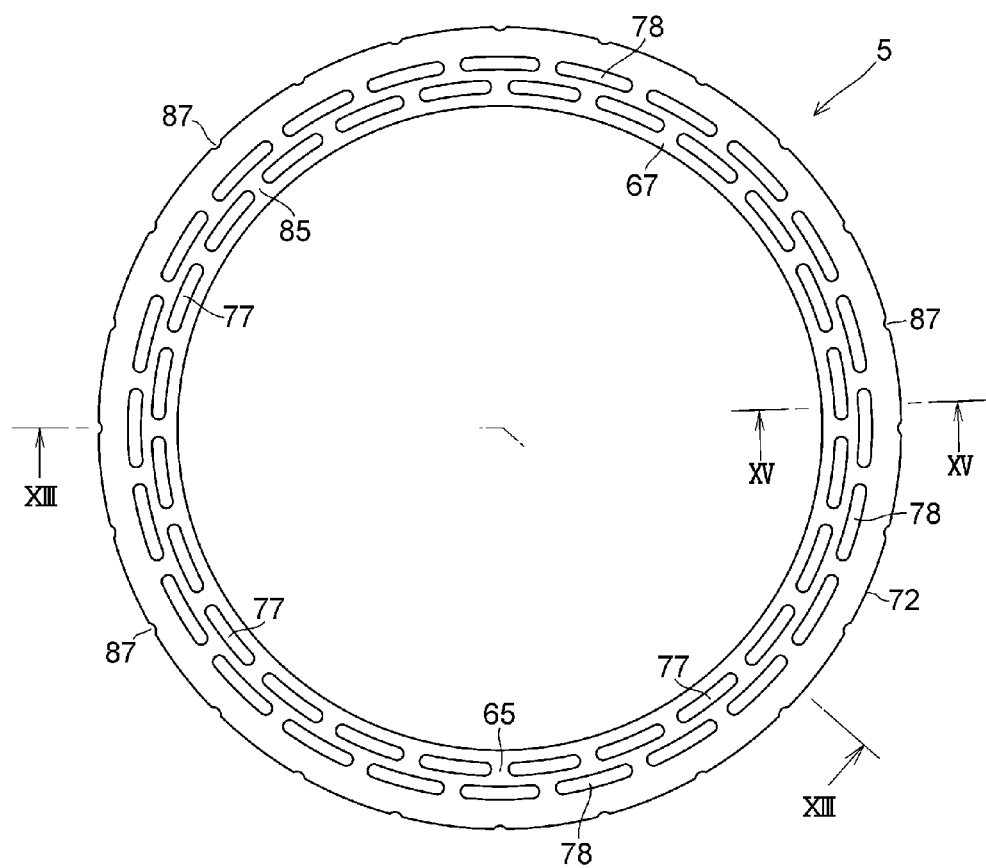
FIG. 12 is an explanatory plan view of a sliding bearing piece of the embodiment shown in FIG. 1.
Figure 13:
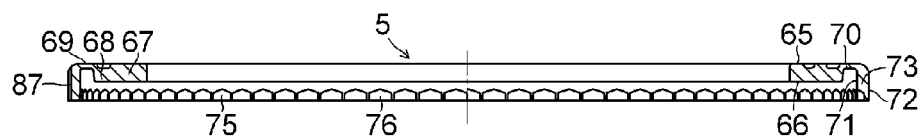
FIG. 13 is an explanatory cross-sectional view, taken in the direction of arrows along line XIII-XIII, of the sliding bearing piece of the embodiment shown in FIG. 12.
Figure 14:
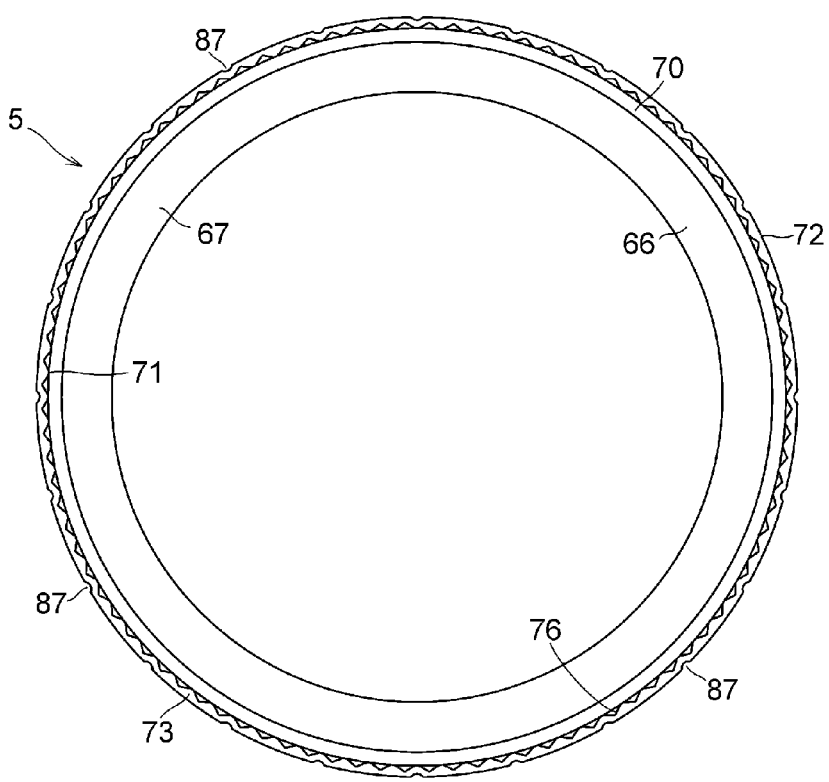
FIG. 14 is an explanatory bottom view of the sliding bearing piece of the embodiment shown in FIG. 12.
Figure 15:
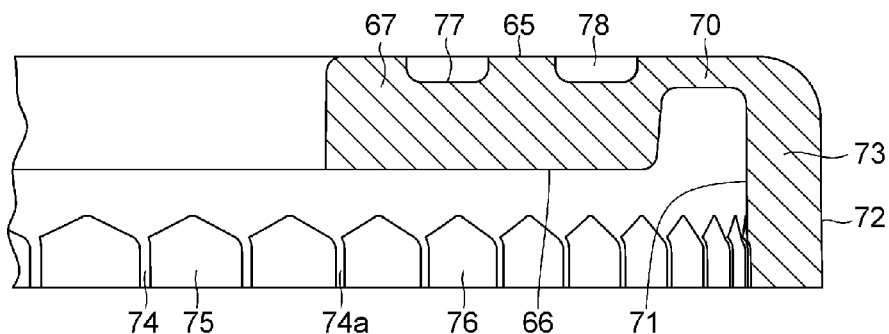
FIG. 15 is an explanatory cross-sectional view, taken in the direction of arrows along line XVI-XVI, of the sliding bearing piece of the embodiment shown in FIG. 12.
Figure 16:
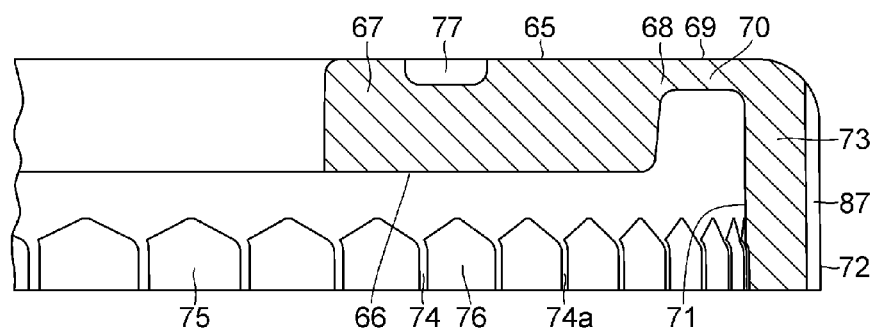
FIG. 16 is an explanatory partially enlarged cross-sectional view of the sliding bearing piece of the embodiment shown in FIG. 13.
Figure 17:
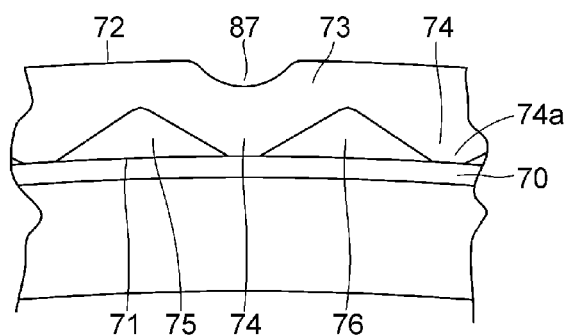
FIG. 17 is an explanatory partially enlarged plan view of the sliding bearing piece of the embodiment shown in FIG. 14.
Figure 18:
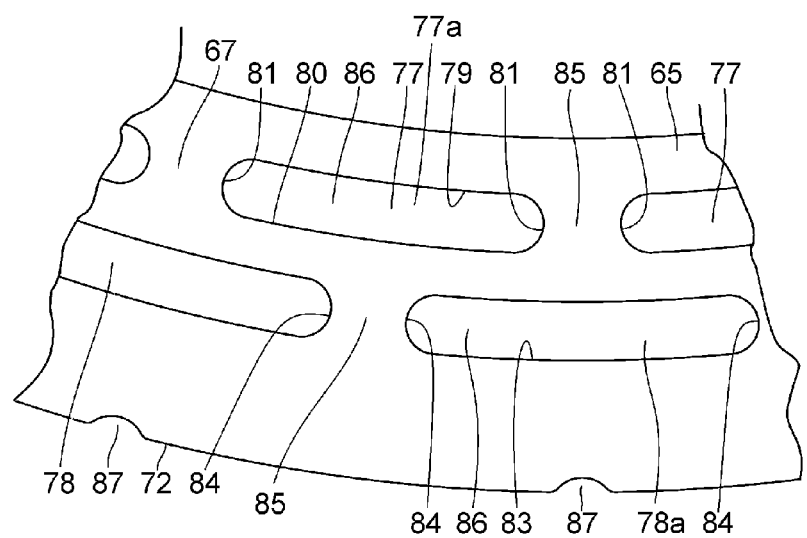
FIG. 18 is an explanatory partially enlarged plan view of the sliding bearing piece of the embodiment shown in FIG. 12.

As shown in FIG. 11, the upper casing 2 and the lower casing 3 are combined by causing the engaging bulged portion 24 of the engaging suspended portion 25 of the upper casing 2 to be resiliently fitted to the engaged bulged portion 49 of the engaging protruding portion 50 of the lower casing 3. Since an engaging gap S of the resiliently fitted section is closed by the annular plate-like portion 52 extending outwardly in the radial direction X from the outer peripheral-side lower end portion 51 of the annular collar portion 42, the ingress of dust and the like from the engaging gap S is prevented as practically as possible.

As particularly shown in FIGS. 12 to 18, the synthetic resin-made sliding bearing piece 5 disposed in the space 4 includes: an annular thrust sliding bearing piece portion 67 having an annular upper surface 65 in the vertical direction Y which is brought into slidable contact with the annular lower surface 6 of the upper casing base portion 7 as well as an annular lower surface 66 which is brought into contact with the annular upper surface 60 of the annular protruding portion 38 of the lower casing base portion 31; a radial sliding bearing piece portion 73 which is suspended from an outer peripheral end portion 68 in the radial direction X of the thrust sliding bearing piece portion 67 via an annular thin-walled portion 70 having an annular upper surface 69 continuously connected to the annular upper surface 65 of the thrust sliding bearing piece portion 67, and which has a cylindrical inner peripheral surface 71 and a cylindrical outer peripheral surface 72; and a corrugated meshing portion 76 in which projecting portions 74 each having a triangular shape in a cross-sectional view and indented portions 75 each having a triangular shape in a cross-sectional view are alternately formed along the circumferential direction R on a lower portion in the vertical direction Y of the cylindrical inner peripheral surface 71 of the radial sliding bearing piece portion 73, an apex portion 74a of each projecting portion 74 being formed flush with the cylindrical inner peripheral surface 71 of the radial sliding bearing piece portion 73.

As the two projecting portions 43 formed on the cylindrical outer peripheral surface 36 of the lower casing base portion 31 mesh with the indented portions 75 in the corrugated meshing portion 76, the sliding bearing piece 5 is prevented (inhibited) from rotating in the circumferential direction R about the axis O with respect to the lower casing 3 and is integrated with the lower casing 3, so that sliding does not occur between the sliding bearing piece 5 and the lower casing 3. Although, in this embodiment, the corrugated meshing portion 76 is formed over the entire circumference in the circumferential direction R of the cylindrical inner peripheral surface 71 of the radial sliding bearing piece portion 73, the corrugated meshing portion 76 may be formed only at those portions of the cylindrical inner peripheral surface 71 of the radial sliding bearing piece portion 73 that correspond to the projecting portions 43.

The thrust sliding bearing piece portion 67 has pluralities of inner recessed portions 77 and outer recessed portions 78 which are formed in its annular upper surface 65 along the circumferential direction R and in at least two rows including an inner row and an outer row in the radial direction X.

Each of the inner recessed portions 77 formed in the inner row is defined by an inner circular arc-shaped wall surface 79 which extends in a circular arc shape about the axis O as the center; an outer circular arc-shaped wall surface 80 which extends in a circular arc shape about the axis O as the center outwardly of the inner circular arc-shaped wall surface 79 in the radial direction X, i.e., whose diameter is enlarged in the radial direction X relative to the inner circular arc-shaped wall surface 79; a pair of semicircular wall surfaces 81 respectively continuously connected to the inner circular arc-shaped wall surface 79 and the outer circular arc-shaped wall surface 80 and opposed to each other in the circumferential direction R; and a bottom wall surface 77a continuously connected to respective ones of the inner circular arc-shaped wall surface 79, the outer circular arc-shaped wall surface 80, and the pair of semicircular wall surfaces 81.

Each of the plurality of outer recessed portions 78 formed in the outer row is defined by an inner circular arc-shaped wall surface 82 which extends in a circular arc shape about the axis O as the center; an outer circular arc-shaped wall surface 83 which extends in a circular arc shape about the axis O as the center outwardly of the inner circular arc-shaped wall surface 82 in the radial direction X, i.e., whose diameter is enlarged in the radial direction X relative to the inner circular arc-shaped wall surface 82; a pair of semicircular wall surfaces 84 respectively continuously connected to both the inner circular arc-shaped wall surface 82 and the outer circular arc-shaped wall surface 83 and opposed to each other in the circumferential direction R; and a bottom wall surface 78a continuously connected to respective ones of the inner circular arc-shaped wall surface 82, the outer circular arc-shaped wall surface 83, and the pair of semicircular wall surfaces 84. Each outer recessed portion 78 is arranged at a position corresponding to a discontinuous portion 85 in the circumferential direction R between adjacent ones of the inner recessed portions 77 formed in the inner row. Thus, the inner recessed portions 77 and the outer recessed portions 78 are arranged with phase differences with respect to each other in the circumferential direction R.

The pluralities of inner recessed portions 77 and outer recessed portions 78, which are formed in the annular upper surface 65 of the thrust sliding bearing piece portion 67 along the circumferential direction R and in two rows including the inner row and the outer row in the radial direction X, are arranged such that the ratio of the total area of opening surfaces 86 of the inner recessed portions 77 and the outer recessed portions 78 in total surfaces which combine the opening surfaces 86 of the inner recessed portions 77 and the outer recessed portions 78 and the annular upper surface 65 of the thrust sliding bearing piece portion 67, i.e., a thrust sliding bearing surface, is 20 to 50%, preferably 30 to 40%.

The radial sliding bearing piece portion 73 has a plurality of axial grooves 87 which are open at their both ends in the vertical direction Y and are formed in the cylindrical outer peripheral surface 72 by being spaced apart at equal intervals in the circumferential direction R.

The pluralities of inner recessed portions 77 and outer recessed portions 78, which are formed in the annular upper surface 65 of the thrust sliding bearing piece portion 67 along the circumferential direction R and in at least two rows including the inner row and the outer row in the radial direction X, as well as the plurality of axial grooves 87 which are formed in the cylindrical outer peripheral surface 72 of the radial sliding bearing piece portion 73, serve as a sump section for lubricating oil such as grease.

Figure 19:
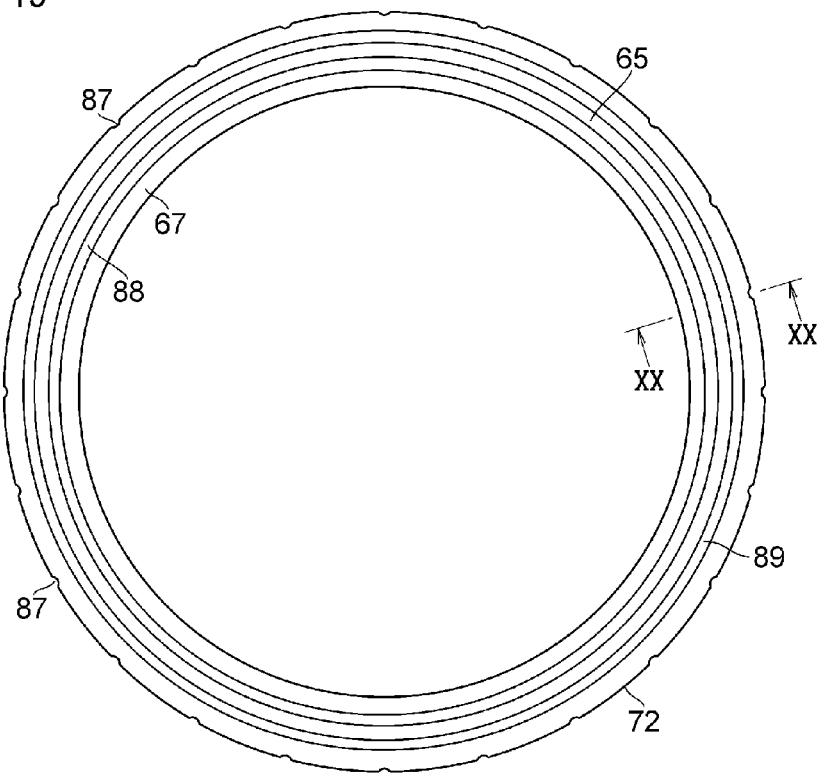
FIG. 19 is an explanatory plan view of another embodiment of the sliding bearing piece of the embodiment shown in FIG. 1.
Figure 20:
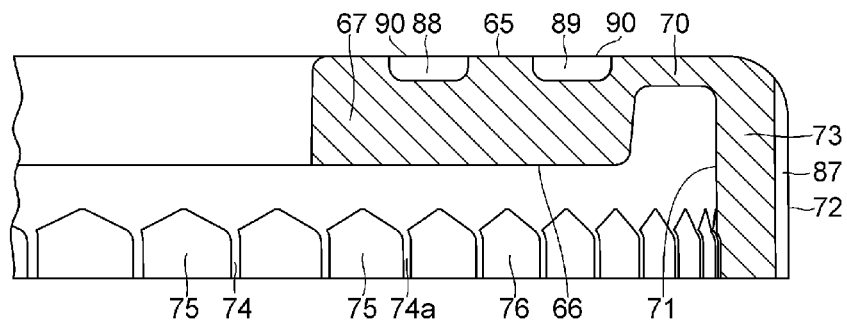
FIG. 20 is an explanatory cross-sectional view, taken in the direction of arrows along line XX-XX, of the sliding bearing piece of the embodiment shown in FIG. 19.
Figure 21:
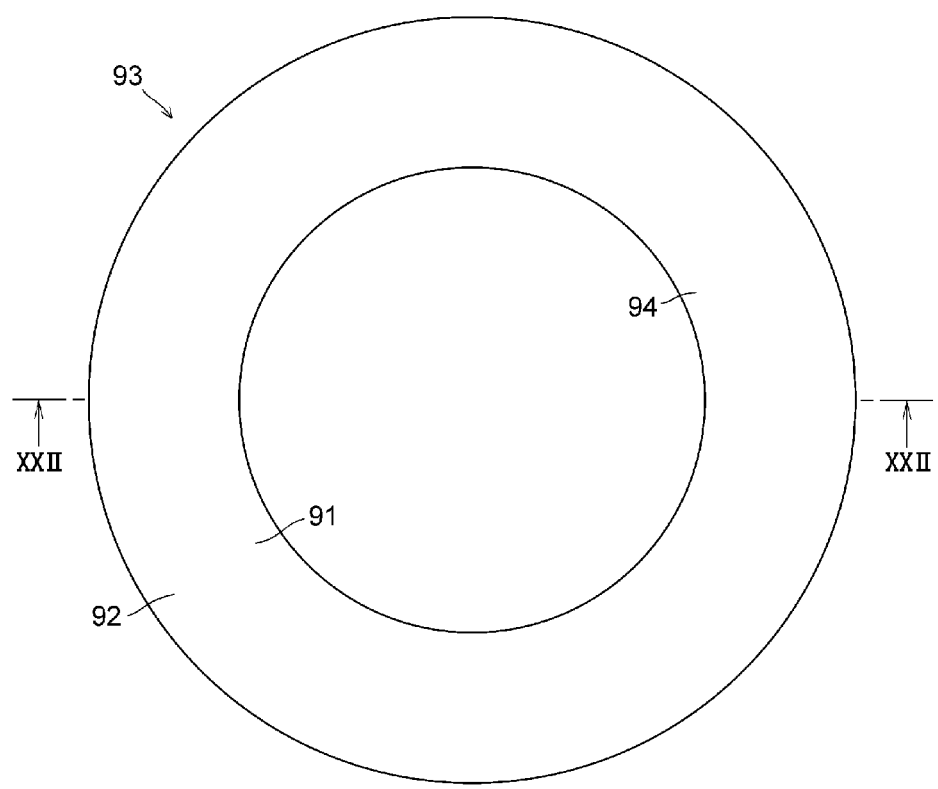
FIG. 21 is an explanatory plan view of a reinforcing member of the embodiment shown in FIG. 1.
Figure 22:
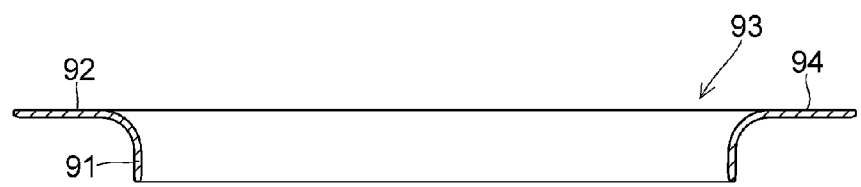
FIG. 22 is an explanatory cross-sectional view, taken in the direction of arrows XXII-XXII, of the reinforcing member of the embodiment shown in FIG. 21.
Figure 23:
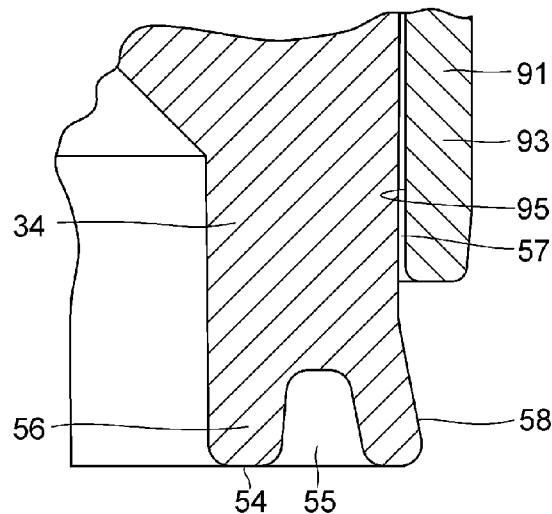
FIG. 23 is an explanatory partially enlarged cross-sectional view of a fitting section between the lower casing and the reinforcing member of the embodiment shown in FIG. 1.

In another embodiment of the sliding bearing piece 5 shown in FIGS. 19 and 20, an inner annular recessed groove 88 and an outer annular recessed groove 89, which are formed along the circumferential direction R and in two rows including an inner row and an outer row in the radial direction X, may be formed in the annular upper surface 65 of the thrust sliding bearing piece portion 67, and the plurality of axial grooves 87 may be formed in the cylindrical outer peripheral surface 72 of the radial sliding bearing piece portion 73 by being spaced apart at equal intervals in the circumferential direction R.

The inner annular recessed groove 88 and the outer annular recessed groove 89, which are formed in the annular upper surface 65 of the thrust sliding bearing piece portion 67 along the circumferential direction R and in two rows including the inner row and the outer row in the radial direction X, are arranged such that the ratio of the total area of opening surfaces 90 of the inner annular recessed groove 88 and the outer annular recessed groove 89 in total surfaces which combine the opening surfaces 90 of the inner annular recessed groove 88 and the outer annular recessed groove 89 and the annular upper surface 65 of the thrust sliding bearing piece portion 67, i.e., a thrust sliding bearing surface, is 20 to 50%, preferably 30 to 40%.

As shown in FIGS. 1 and 3, the sliding bearing piece 5 is assembled to the lower casing 3 such that the annular lower surface 66 of the thrust sliding bearing piece portion 67 is brought into contact with the annular upper surface 60 of the annular protruding portion 38 of the lower casing base portion 31, and the cylindrical inner peripheral surface 71 of the radial sliding bearing piece portion 73 is brought into contact with the cylindrical inner peripheral surface 32 of the lower casing base portion 31, and such that the projecting portions 43 of the lower casing base portion 31 is meshed with the indented portions 75 of the corrugated meshing portion 76 on the cylindrical inner peripheral surface 32 of the lower casing base portion 31 so that the sliding bearing piece 5 is prevented from rotating in the circumferential direction R about the axis O with respect to the lower casing 3 and is integrated with the lower casing 3.

The upper casing 2 is assembled to the sliding bearing piece 5 assembled to the lower casing 3 by bringing the annular lower surface 6 of the upper casing base portion 7 into slidable contact with the annular upper surface 65 of the thrust sliding bearing piece portion 67, and by bringing the cylindrical inner peripheral surface 15 of the outer peripheral-side cylindrical suspended portion 11 of the upper casing base portion 7 into slidable contact with the cylindrical outer peripheral surface 72 of the radial sliding bearing piece portion 73.

According to the sliding bearing 1 thus formed, sliding surfaces are formed only between the thrust sliding bearing piece portion 67 of the sliding bearing piece 5 and the annular lower surface 6 of the upper casing base portion 7 and between the radial sliding bearing piece portion 73 and the cylindrical inner peripheral surface 15 of the outer peripheral-side cylindrical suspended portion 11 of the upper casing base portion 7; the pluralities of inner recessed portions 77 and outer recessed portions 78, or the inner annular recessed groove 88 and the outer annular recessed groove 89, are formed in the annular upper surface 65 of the thrust sliding bearing piece portion 67, which serves as a sliding surface, along the circumferential direction R and in two rows including the inner row and the outer row in the radial direction X; and the plurality of axial grooves 87 are formed in the cylindrical outer peripheral surface 72 of the radial sliding bearing piece portion 73, which serves as a sliding surface, along the circumferential direction R. Therefore, in the relative rotation in the circumferential direction R about the axis O between the annular upper surface 65 of the thrust sliding bearing piece portion 67 and the annular lower surface 6 of the upper casing base portion 7 and in the relative rotation in the circumferential direction R about the axis O between the cylindrical outer peripheral surface 72 of the radial sliding bearing piece portion 73 and the cylindrical inner peripheral surface 15 of the outer peripheral-side cylindrical suspended portion 11 of the upper casing base portion 7, the area of contact with the annular lower surface 6 of the upper casing base portion 7 and the area of contact with the cylindrical inner peripheral surface 15 of the outer peripheral-side cylindrical suspended portion 11 of the upper casing base portion 7 are reduced, thereby making it possible to increase the surface pressure (load per unit area) acting on the annular upper surface 65 and the cylindrical inner peripheral surface 15 of the outer peripheral-side cylindrical suspended portion 11. Thus, it is possible to attain further lower friction through a combination of the lower friction due to the friction between the synthetic resins and the lower friction due to the presence on the sliding surfaces of the lubricating oil which is filled in the inner recessed portions 77 and the outer recessed portions 78, or the inner annular recessed groove 88, the outer annular recessed groove 89, and the axial grooves 90.

The metallic reinforcing member 93, which is shown in FIGS. 21 to 24 and has a cylindrical portion 91 and a wide annular collar portion 92 extending outwardly in the radial direction X from one end portion of the cylindrical portion 91, is fitted to the lower casing 3 by bringing a surface 94 of the wide annular collar portion 92 into contact with the annular lower surface 30 of the lower casing base portion 31 and the annular lower surface 41 of the annular collar portion 42, and by fitting a cylindrical inner peripheral surface 95 of the cylindrical portion 91 over the cylindrical outer peripheral surface 57 of the cylindrical protruding portion 34 of the lower casing base portion 31.

Figure 24:
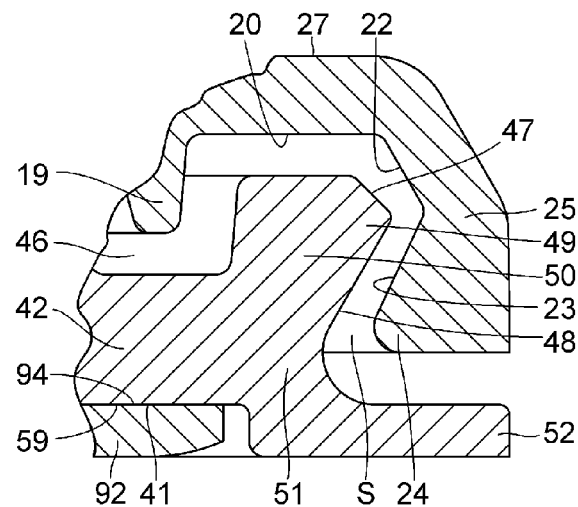
FIG. 24 is an explanatory partially enlarged cross-sectional view of a fitting section between the lower casing and a collar portion of the reinforcing member of the embodiment shown in FIG. 1.

As the metallic reinforcing member 93 is fitted to the lower casing 3, the annular lower surface 30 of the lower casing base portion 31 of the lower casing 3, which serves as a spring seat for the suspension coil, is reinforced by the reinforcing member 93. When this reinforcing member 93 is fitted to the lower casing 3, the end portion 56 of the cylindrical protruding portion 34 on which the annular tapered surface 58 of the lower casing base portion 31 is formed undergoes resilient deformation due to its imparted flexibility and facilitates the fitting of the reinforcing member 93 over the cylindrical outer peripheral surface 57 of the cylindrical protruding portion 34 of the lower casing base portion 31. After the fitting, as shown in FIG. 24, the annular tapered surface 58 of the end portion 56 of the cylindrical protruding portion 34 is resiliently restored more outwardly in the radial direction X than the cylindrical outer peripheral surface 57 of the cylindrical protruding portion 34 of the lower casing base portion 31, and the end portion of the cylindrical portion 91 of the reinforcing member 93 is therefore prevented from coming off downwardly in the vertical direction Y, so that the lower casing 3 and the reinforcing member 93 can be handled as an integral unit, thereby making it possible to facilitate the mounting of the sliding bearing 1 with the reinforcing member 93 fitted thereto to the strut assembly.

Figure 25:
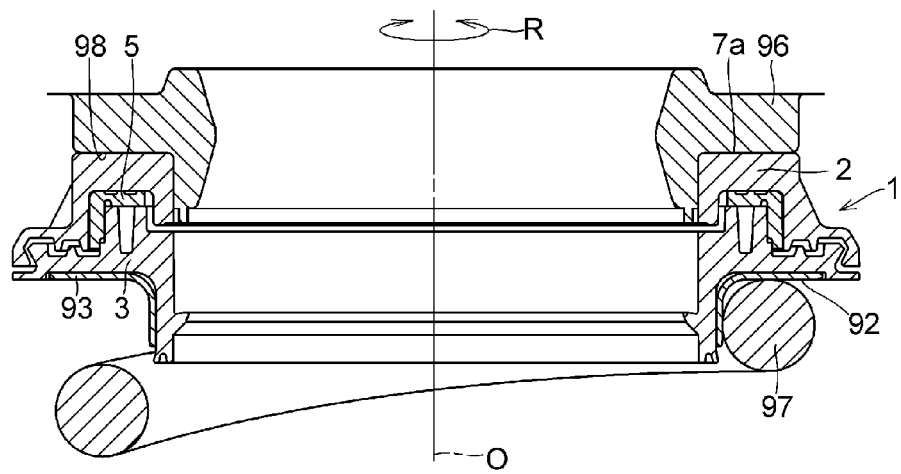
FIG. 25 is an explanatory cross-sectional view in which the sliding bearing shown in FIG. 1 is incorporated in a strut-type suspension.

As shown in FIG. 25, for example, the synthetic resin-made sliding bearing 1 thus formed may be applied to a strut-type suspension in a four-wheeled motor vehicle by disposing the synthetic resin-made sliding bearing 1 in accordance with this embodiment between a vehicle body-side bearing surface 98 of a vehicle body-side mounting member 96 and an upper end portion of a suspension coil spring 97 such that the annular upper surface 7a of the upper casing 2 is brought into contact with the vehicle body-side mounting member 96, and such that the annular lower surface 30 of the lower casing base portion 31 as a spring bearing surface, or the annular collar portion 92 of the metallic reinforcing member 93 fitted to the annular lower surface 30 of the lower casing base portion 31, is abutted against the upper end portion of the suspension coil spring 97.

In the strut-type suspension shown in FIG. 25, the relative rotation in the circumferential direction R of the suspension coil spring 97 with respect to the vehicle body-side mounting member 96 is allowed in the sliding bearing 1 by the relative sliding in the circumferential direction R between the respective synthetic resins, excelling in the sliding characteristics, of the annular upper surface 65 of the thrust sliding bearing piece portion 67 with respect to the annular lower surface 6 of the upper casing base portion 7 and of the cylindrical outer peripheral surface 72 of the radial sliding bearing piece portion 73 with respect to the cylindrical inner peripheral surface 15 of the outer peripheral-side cylindrical suspended portion 11 of the upper casing base portion 7.

DESCRIPTION OF REFERENCE NUMERALS

1: sliding bearing
2: upper casing
3: lower casing
4: space
5: sliding bearing piece
6: annular lower surface
7: upper casing base portion
9: inner peripheral-side cylindrical suspended portion
11: outer peripheral-side cylindrical suspended portion
24: engaging bulged portion
25: engaging suspended portion
30: annular lower surface
31: lower casing base portion
34: cylindrical protruding portion
38: annular protruding portion
42: annular collar portion
43: projecting portion
49: engaged bulged portion
50: engaging protruding portion
67: thrust sliding bearing piece portion
73: radial sliding bearing piece portion
74: projecting portion
75: indented portion
76: corrugated meshing portion

The invention claimed is:

1. A synthetic resin-made sliding bearing comprising: a synthetic resin-made upper casing, a synthetic resin-made lower casing superposed on said upper casing so as to be rotatable about an axis relative to said upper casing, and a synthetic resin-made sliding bearing piece disposed between said upper casing and said lower casing, wherein said upper casing includes: an upper casing base portion having an annular lower surface; an inner peripheral-side cylindrical suspended portion suspended from a radial inner peripheral end portion of the upper casing base portion; and an outer peripheral-side cylindrical suspended portion suspended from a radial outer peripheral end portion of the upper casing base portion, wherein said lower casing includes: a lower casing base portion having an annular upper surface and an annular lower surface; a cylindrical protruding portion which protrudes downwardly from the annular lower surface of the lower casing base portion and has a cylindrical inner peripheral surface continuously connected to a cylindrical inner peripheral surface of the lower casing base portion; an annular protruding portion which protrudes upwardly from the annular upper surface of the lower casing base portion and has a cylindrical outer peripheral surface continuously connected to a cylindrical outer peripheral surface of the lower casing base portion; an annular collar portion which extends radially outwardly from a lower end portion of the cylindrical outer peripheral surface of the lower casing base portion; and at least one projecting portion which projects radially outwardly from the cylindrical outer peripheral surface of the lower casing base portion and extends upwardly from an annular upper surface of the annular collar portion, and wherein said sliding bearing piece includes: a thrust sliding bearing piece portion having an annular upper surface and an annular lower surface; a cylindrical radial sliding bearing piece portion which is suspended from an outer peripheral end portion of the thrust sliding bearing piece portion and has a cylindrical inner peripheral surface and a cylindrical outer peripheral surface; and a corrugated meshing portion having projecting portions and indented portions which are alternately formed along the circumferential direction on a lower portion of the cylindrical inner peripheral surface of the radial sliding bearing piece portion, said sliding bearing piece being disposed between said upper casing and said lower casing such that the annular lower surface of the thrust sliding bearing piece portion is brought into contact with an annular upper surface of the annular protruding portion of said lower casing, and the cylindrical inner peripheral surface of the radial sliding bearing piece portion is brought into contact with the cylindrical outer peripheral surface of the annular protruding portion of said lower casing, and such that the indented portion of the corrugated meshing portion is meshed with the projecting portion of said lower casing so that said sliding bearing piece is prevented from rotating about the axis with respect to said lower casing.

2. The synthetic resin-made sliding bearing according to claim 1, wherein the lower casing base portion and the cylindrical protruding portion protruding downwardly from the annular lower surface of the lower casing base portion are reinforced by a metallic reinforcing member having a cylindrical portion which is fitted over a cylindrical outer peripheral surface of the cylindrical protruding portion and an annular collar portion which is formed integrally with one end portion of the cylindrical portion and is in contact with the annular lower surface of the lower casing base portion.

3. The synthetic resin-made sliding bearing according to claim 2, wherein an annular recessed groove is formed in an annular end face of the cylindrical protruding portion, and an outer peripheral surface of an end portion of the cylindrical outer peripheral surface of the cylindrical protruding portion with the annular recessed groove formed therein is formed as an annular tapered surface which gradually expands radially outwardly of the cylindrical outer peripheral surface of the cylindrical protruding portion, excluding the outer peripheral surface of the end portion, toward the annular end face of the cylindrical protruding portion, the reinforcing member fitted over the cylindrical outer peripheral surface of the cylindrical protruding portion being prevented from coming off downwardly as the outer peripheral surface of the end portion formed as the annular tapered surface of the cylindrical protruding portion in the cylindrical portion projects radially outwardly on a lower end surface side of the cylindrical portion.

4. The synthetic resin-made sliding bearing according to claim 1, wherein the thrust sliding bearing piece portion has pluralities of inner recessed portions and outer recessed portions which are formed in an annular upper surface thereof along a circumferential direction and in at least two rows including an inner row and an outer row in a radial direction, the inner recessed portions and the outer recessed portions are arranged with phase differences with respect to each other in the circumferential direction, and the radial sliding bearing piece portion has a plurality of axial grooves which are open in the vertical direction and are formed in a cylindrical outer peripheral surface thereof by being spaced apart at equal intervals in the circumferential direction.

5. The synthetic resin-made sliding bearing according to claim 4, wherein each of the plurality of inner recessed portions is defined by an inner circular arc-shaped wall surface extending in a circular arc shape about the axis as a center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

6. The synthetic resin-made sliding bearing according to claim 4, wherein each of the plurality of outer recessed portions is defined by an inner circular arc-shaped wall surface extending in a circular arc shape about the axis as the center; an outer circular arc-shaped wall surface extending in a circular arc shape about the axis as the center radially outwardly of the inner circular arc-shaped wall surface; a pair of semicircular wall surfaces respectively continuously connected to the inner circular arc-shaped wall surface and the outer circular arc-shaped wall surface and opposed to each other in the circumferential direction; and a bottom wall surface continuously connected to respective ones of the inner circular arc-shaped wall surface, the outer circular arc-shaped wall surface, and the pair of semicircular wall surfaces.

7. The synthetic resin-made sliding bearing according to claim 4, wherein a ratio of a total area of opening surfaces of the pluralities of inner recessed portions and outer recessed portions in surfaces which combine the opening surfaces of the pluralities of inner recessed portions and outer recessed portions and the annular upper surface of the thrust sliding bearing piece portion is 20 to 50%.

8. The synthetic resin-made sliding bearing according to claim 4, wherein the thrust sliding bearing piece portion has annular recessed grooves which are formed in an annular upper surface thereof along the circumferential direction and in at least two rows including an inner row and an outer row and formed concentrically with each other.

9. The synthetic resin-made sliding bearing according to claim 8, wherein a ratio of a total area of opening surfaces of the pluralities of inner recessed portions and outer recessed portions and opening surfaces of the at least two annular recessed grooves in surfaces which combine the opening surfaces of the pluralities of inner recessed portions and outer recessed portions, opening surfaces of the annular recessed grooves, and the annular upper surface of the thrust sliding bearing piece portion is 20 to 50%.

10. The synthetic resin-made sliding bearing according to claim 1, wherein the thrust sliding bearing piece portion has annular recessed grooves which are formed in an annular upper surface thereof along the circumferential direction and in at least two rows including an inner row and an outer row and formed concentrically with each other.

11. The synthetic resin-made sliding bearing according to claim 10, wherein a ratio of a total area of opening surfaces of the annular recessed grooves in total surfaces which combine the opening surfaces of the annular recessed grooves and the annular upper surface of the thrust sliding bearing piece portion is 20 to 50%.

* * * * *

UNITED STATES PATENT AND TRADEMARK OFFICE
CERTIFICATE OF CORRECTION

PATENT NO. : 9,707,816 B2  
APPLICATION NO. : 15/363057  
DATED : July 18, 2017  
INVENTOR(S) : Sakairi et al.

It is certified that error appears in the above-identified patent and that said Letters Patent is hereby corrected as shown below:

In the Claims

Claim 9, Column 18, Lines 25-33 should read:
--9. The synthetic resin-made sliding bearing according to claim 8, wherein a ratio of a total area of opening surfaces of the pluralities of inner recessed portions and outer recessed portions and opening surfaces of the annular recessed grooves in surfaces which combine the opening surfaces of the pluralities of inner recessed portions and outer recessed portions, opening surfaces of the annular recessed grooves, and the annular upper surface of the thrust sliding bearing piece portion is 20 to 50%.--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*